(12) United States Patent
Shen et al.

(10) Patent No.: US 11,500,744 B2
(45) Date of Patent: Nov. 15, 2022

(54) METHOD FOR PRIMARY-BACKUP SERVER SWITCHING, AND CONTROL SERVER

(71) Applicant: Beijing Dajia Internet Information Technology Co., Ltd., Beijing (CN)

(72) Inventors: Hang Shen, Beijing (CN); Erqi Chen, Beijing (CN); Yu Gao, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/481,602

(22) Filed: Sep. 22, 2021

(65) Prior Publication Data
US 2022/0004469 A1 Jan. 6, 2022

Related U.S. Application Data

(63) Continuation of application No. PCT/CN2020/075769, filed on Feb. 18, 2020.

(30) Foreign Application Priority Data

Mar. 22, 2019 (CN) .......................... 201910223583.7

(51) Int. Cl.
*G06F 11/00* (2006.01)
*G06F 11/20* (2006.01)
*G06F 11/14* (2006.01)

(52) U.S. Cl.
CPC ...... *G06F 11/2028* (2013.01); *G06F 11/1451* (2013.01); *G06F 2201/80* (2013.01)

(58) Field of Classification Search
CPC ............. G06F 11/1451; G06F 11/1469; G06F 11/2025; G06F 11/2028; G06F 11/2041
See application file for complete search history.

(56) References Cited

U.S. PATENT DOCUMENTS

| 10,754,873 B2 | 8/2020 | Shao | |
|---|---|---|---|
| 2002/0152446 A1* | 10/2002 | Fleming | G06F 11/0715 714/815 |

(Continued)

FOREIGN PATENT DOCUMENTS

| CN | 1808394 A | 7/2006 |
|---|---|---|
| CN | 103207841 A | 7/2013 |

(Continued)

OTHER PUBLICATIONS

Redis Cluster Specification, Redis, https://redis.io/topics/cluster-spec, Jan. 2019—retrieved with Wayback Machine (Year: 2019).*

(Continued)

*Primary Examiner* — Michael Maskulinski
(74) *Attorney, Agent, or Firm* — Meunier Carlin & Curfman LLC

(57) ABSTRACT

A method for primary-backup server switching. A control server monitors whether a primary server fails. The control server is in communication connection with the primary server and a backup server. The primary server is provided with a primary memory database. The primary memory database is configured to save in real time state information of the primary server each time after an operation is executed, and the state information is read and saved in real time by a backup memory database in a backup server. In response to a failure of the primary server, the control server sends a primary-backup switching command to the backup server. The primary-backup switching command is configured to instruct the backup server to upgrade itself to become a new primary server according to the state information saved in the backup memory database.

15 Claims, 4 Drawing Sheets

(56) References Cited

U.S. PATENT DOCUMENTS

| | | |
|---|---|---|
| 2003/0120669 A1 | 6/2003 | Han et al. |
| 2004/0193625 A1 | 9/2004 | Sutoh et al. |
| 2014/0358859 A1 | 12/2014 | Ishii et al. |
| 2016/0132411 A1 | 5/2016 | Jolad et al. |
| 2016/0171073 A1* | 6/2016 | Hattori ................ G06F 11/2025 707/736 |

FOREIGN PATENT DOCUMENTS

| | | |
|---|---|---|
| CN | 103530200 A | 1/2014 |
| CN | 106254236 A | 12/2016 |
| CN | 106940699 A | 7/2017 |
| CN | 106980625 A | 7/2017 |
| CN | 109376197 A | 2/2019 |
| CN | 109936481 A | 6/2019 |
| CN | 102043686 A | 11/2019 |
| KR | 100439857 B1 | 7/2004 |

OTHER PUBLICATIONS

Redis Sentinel Documentation, Redis, https://redis.io/topics/sentinel, Jan. 2019—retrieved with Wayback Machine (Year: 2019).*

Redis Replication, Redis, https://redis.io/topics/replication, Jan. 2019—retrieved with Wayback Machine (Year: 2019).*

AWS website: https://web.archive.org/web/20190301065000/https://aws.amazon.com/redis retrieved with wayback machine from Mar. 1, 2019 (Year: 2019).*

International Search Report issued in PCT/CN2020/075769, dated May 9, 2020 (4 pages).

English Translation of Chinese Second Office Action issued in CN 201910223583.7, dated Dec. 15, 2020 (9 pages).

English Translation of Notification to Grant the Patent Right for Invention issued CN 201910223583.7, dated May 31, 2021.

* cited by examiner

METHOD FOR PRIMARY-BACKUP SERVER SWITCHING, AND CONTROL SERVER

CROSS REFERENCE TO RELATED APPLICATIONS

The present disclosure is a continuation of International Application No. PCT/CN2020/075769, filed on Feb. 18, 2020, which claims the priority of Chinese Patent Application No. 201910223583.7, filed on Mar. 22, 2019, both of which are incorporated herein by reference.

FIELD

The present disclosure relates to the field of data processing technology, in particular to a method for a primary-backup server switching, and a control server.

BACKGROUND

In a distributed storage system, in order to ensure that services can be quickly restored after a server failure, a backup server may be set up in the system. Once a primary server fails, the backup server may be switched to be as a primary server to continue to provide services.

SUMMARY

According to a first aspect of an embodiment of the present disclosure, a method for primary-backup server switching is provided. The method for primary-backup server switching is applied to a control server in communication connection with a primary server and a backup server, and includes:

monitoring whether the primary server fails, wherein the primary server is provided with a primary memory database, the primary memory database is configured to save in real time state information of the primary server each time after an operation is executed by the primary server, and the state information is configured to be read and saved in real time by a backup memory database disposed in the backup server; and sending a primary-backup switching command to the backup server in response to a failure of the primary server, wherein the primary-backup switching command is configured to instruct the backup server to be upgraded as a new primary server according to the state information saved in the backup memory database.

According to a second aspect of an embodiment of the present disclosure, a control server is provided. The control server is in communication connection with a primary server and a backup server, and includes:

a processor; and a memory, configured to store instructions executable by the processor; wherein the processor is configured to:

monitor whether the primary server fails, wherein the primary server is provided with a primary memory database, the primary memory database is configured to save in real time state information of the primary server each time after an operation is executed by the primary server, and the state information is configured to be read and saved in real time by a backup memory database disposed in the backup server; and send a primary-backup switching command to the backup server in response to a failure of the primary server, wherein the primary-backup switching command is configured to instruct the backup server to be upgraded as a new primary server according to the state information saved in the backup memory database.

According to a third aspect of an embodiment of the present disclosure, a non-transitory computer-readable storage medium is provided. Instructions in the non-transitory computer-readable storage medium cause an electronic device to implement steps of the method for primary-backup server switching, when the instructions are executed by a processor of the electronic device. Wherein the method includes:

monitoring whether the primary server fails, wherein the primary server is provided with a primary memory database, the primary memory database is configured to save in real time state information of the primary server each time after an operation is executed by the primary server, and the state information is configured to be read and saved in real time by a backup memory database disposed in the backup server; and sending a primary-backup switching command to the backup server in response to a failure of the primary server, wherein the primary-backup switching command is configured to instruct the backup server to be upgraded as a new primary server according to the state information saved in the backup memory database.

DETAILED DESCRIPTION OF THE EMBODIMENTS

Figure 1:
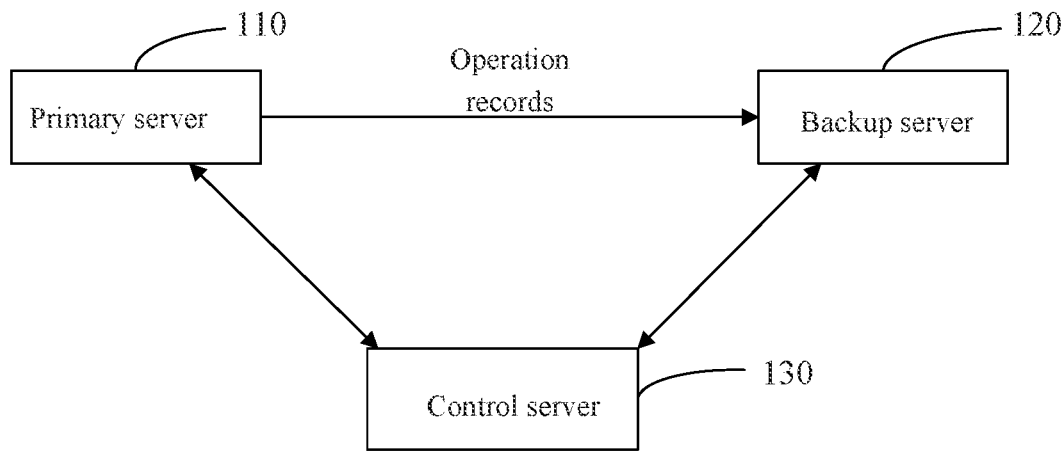
FIG. 1 is a schematic diagram of a distributed storage system in the related art.

FIG. 1 is a schematic diagram of a distributed storage system in the related art. As shown in FIG. 1, in order to realize primary-backup server switching, a distributed storage system is generally provided with a primary server 110, a backup server 120 and a control server 130.

Stateful service is a commonly used service method. After receiving a request from a client, a server may determine how to respond to the request based on its current working state.

In the distributed storage system with stateful service, the control server 130 monitors whether the primary server 110 fails, and in response to a failure of the primary server 110, the backup server 120 must be quickly restored to a state of the primary server 110 before the primary server 110 fails, so as to provide services. Therefore, the backup server 120 may perform the same operations as the primary server 110 in real time. For example, taking the operation of creating a file as an example, the primary server 110 receives an operation request for creating the file, and stores an operation record of the operation into a log after executing the operation of creating the file; and then, the log is read and asynchronously transmitted to the backup server 120, and the backup server 120 performs the same operation of creating a file to reach the same state as the primary server 110.

However, due to the limitation of the memory capacity, the Least Recently Used (LRU) algorithm of a virtual page storage management service adopted by the primary server 110 may store some logs in the memory or a hard disk, which results in a time-consuming process of reading operation records therefrom. When the primary server 110 fails, there may be a case where the operation records cannot be transmitted to the backup server 120 in time, which results in that the backup server 120 is not able to perform the same operation and cannot maintain the same state of the original primary server 110 before the failure of the original primary server 110 after the backup server 120 is switched to be as a primary server.

Figure 2:
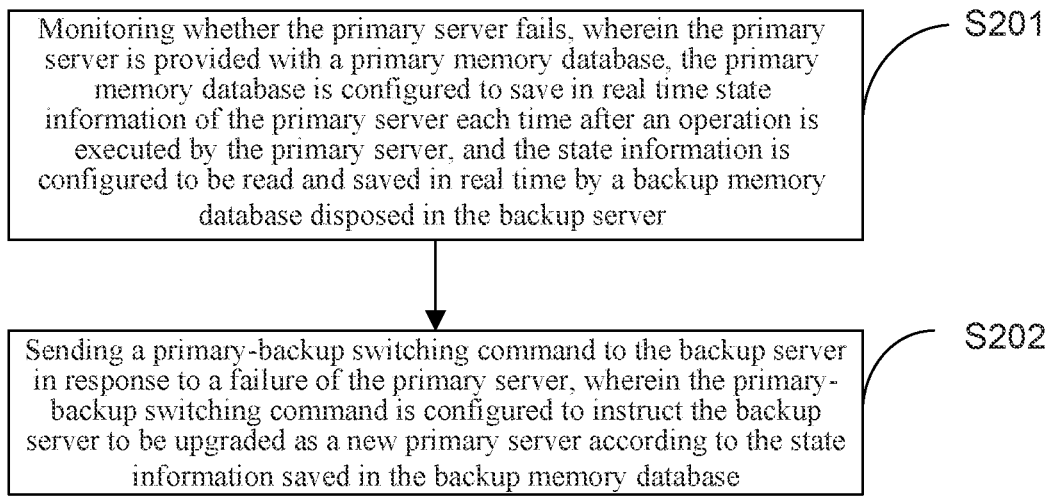
FIG. 2 is a flowchart of a method for primary-backup server switching according to some embodiments of the present disclosure.

FIG. 2 is a flowchart of a method for primary-backup server switching according to an exemplary embodiment. As shown in FIG. 2, the method for primary-backup server switching is applied to a control server in communication connection with a primary server and a backup server, and includes the followings.

In S201, whether the primary server fails is monitored. The primary server is provided with a primary memory database. The primary memory database is configured to save in real time state information of the primary server each time after an operation is executed by the primary server. The state information is configured to be read and saved in real time by a backup memory database disposed in the backup server.

In embodiments of the present disclosure, the operations executed by the primary server may include file editing operations such as file creation and file deletion. The state information includes a result of each operation executed by the primary server. A failure of the primary server may include crash of the primary server caused by various reasons.

Figure 3:
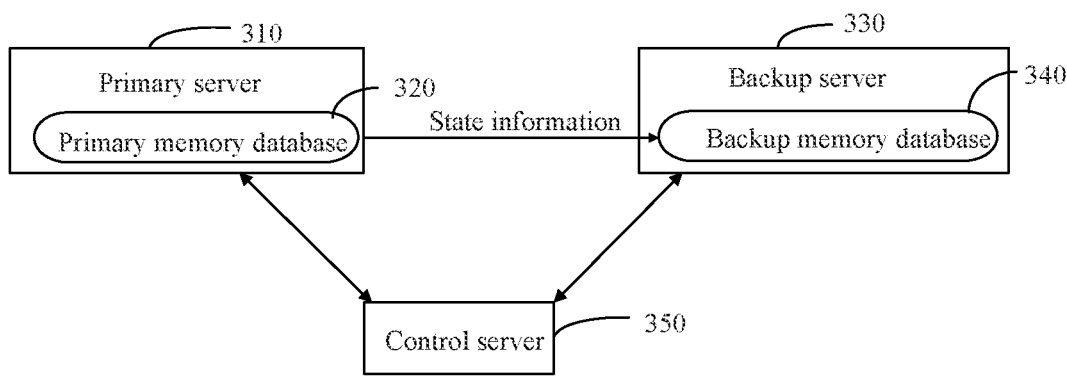
FIG. 3 is a schematic diagram of a distributed storage system with stateful service according to some embodiments of the present disclosure.

In some embodiments, as shown in FIG. 3, the control server 350 monitors a network connection state of the primary server 310 in real time. The primary memory database 320 and the backup memory database 340 may be set in the primary server 310 and the backup server 330, respectively. The primary memory database and the backup memory database may be Redis memory databases. The Redis memory database is a key-value database. The primary Redis memory database has a function of writing data, and the backup Redis memory database has a function of reading the data. In embodiments of the present disclosure, the primary server writes the state information into the primary Redis memory database in real time. In the primary Redis memory database, a key is an index node (Mode) number of each file, and a value corresponding to the key stores the state information of each file. The state information of the primary server may be read from the primary Redis memory database in real time by the backup Redis memory database, and saved in the same key-value form.

In S202, in response to a failure of the primary server, a primary-backup switching command is sent to the backup server. The primary-backup switching command is configured to instruct the backup server to be upgraded as a new primary server according to the state information saved in the backup memory database.

In some embodiments, since the state information in the primary memory database 320 is configured to be read and saved in real time by the backup memory database 340, when receiving the primary-backup switching command sent by the control server 350 after the control server 350 monitors out the failure of the primary server 310, the backup server may change its own role from the original backup server to a primary server, that is, upgrading to be as the new primary server based on the saved state information, and continues to provide services.

With the technical solution provided by embodiments of the present disclosure, since the state information of the primary server is written into the primary memory database in real time, and the backup memory database in the backup server reads the state information from the primary memory database in real time, when the primary server fails, the backup server can quickly keep the state consistent with the state of the primary server before the failure, which effectively solves the problem that it takes a long time for the primary server to read operation records from a memory or a hard disk.

Figure 4:
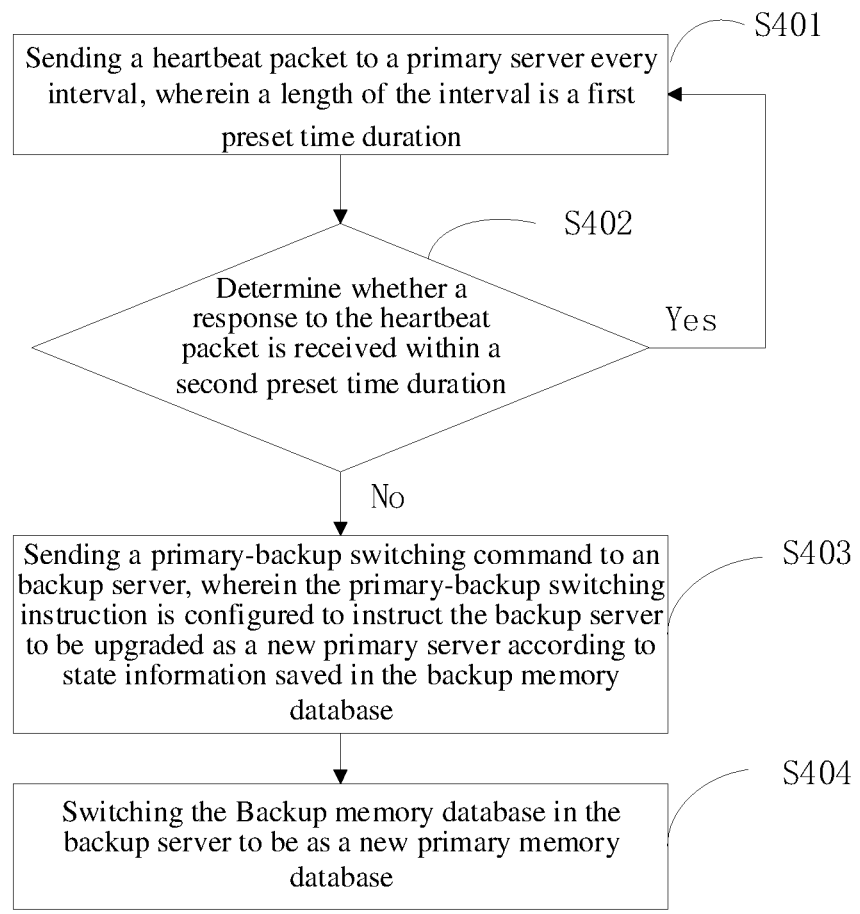
FIG. 4 is a flowchart of another method for primary-backup server switching according to some embodiments of the present disclosure.

FIG. 4 is a flowchart of another method for primary-backup server switching according to an exemplary embodiment. As shown in FIG. 4, the method for primary-backup server switching is applied to a control server in communication connection with a primary server and a backup server, and includes the followings.

In S401, a heartbeat packet is sent to the primary server every a first time period.

In embodiments of the present disclosure, when a processed service has a high requirement for real-time performance or when the primary server needs to be monitored in real time as much as possible, the first time period may be set to be shorter, for example, the heartbeat packet is sent to the primary server every 20 seconds. On the contrary, when the requirement of the service for the real-time performance is not high, or when the primary server does not need to be monitored in real time, the first time period may be set to be longer.

In S402, whether a response to the heartbeat packet is received within a second time period is determined. If so, it is determined that the primary server is normal, and S401 is executed again. Otherwise, it is determined that the primary server fails, and S403 is executed.

In some embodiments, the second time period may also be set according to specific conditions. If the control server does not receive the response of the primary server to the heartbeat packet within the second time period, the primary server is determined to fail.

It can be understood that a server failure may result in service interruption, which in turn may have a significant impact on user usage. In embodiments of the present disclosure, the control server monitors a state of the primary server by sending the heartbeat packets regularly, and can know whether the primary server fails in time, and determine its availability.

In S403, a primary-backup switching command is sent to the backup server. The primary-backup switching command is configured to instruct the backup server to be upgraded as a new primary server according to state information saved in the backup memory database.

In S404, the backup memory database in the backup server is switched to be as a new primary memory database.

In embodiments of the present disclosure, there may be one or more backup servers. When there are multiple backup servers, each backup server contains a backup memory database storing state information. Similar to S201 in the embodiment shown in FIG. 2, a memory database in the primary server saves state information of the primary server in real time to be read and saved in real time by the backup memory database in each backup server. When the primary server fails, the control server selects one backup server from the multiple backup servers as a target backup server, and then sends the primary-backup switching command to the target backup server. Thus, the target backup server is upgraded as a new primary server based on the state information saved in the backup memory database of the target backup server, and the backup memory database in the target backup server is switched to be as a new primary memory database.

It can be seen from the embodiment shown in FIG. 4 that the primary memory database saves the state information of the primary server each time after an operation is executed by the primary server, so that the state information may be read and saved in real time by the backup memory database in the backup server. The problem that it takes a long time for the backup server to read operation records from a memory or a hard disk, causing a state of the backup server to be not completely consistent with the state of the primary server before a failure can be effectively solved. The backup server can take over the responsibilities of the primary server in a short time, the impact of the primary-backup server switching on the service is reduced, and the service availability and continuity are improved to the maximum extent.

Figure 5:
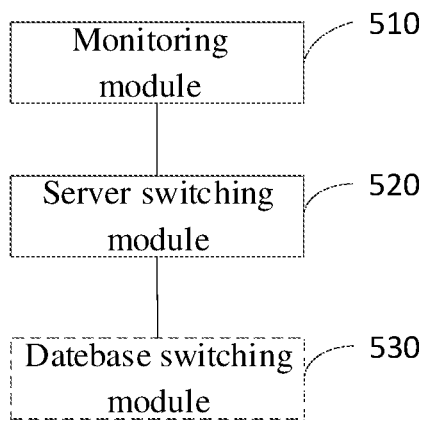
FIG. 5 is a block diagram of a primary-backup server switching apparatus according to some embodiments of the present disclosure.

FIG. 5 is a block diagram of a primary-backup server switching apparatus according to an exemplary embodiment. Referring to FIG. 5, the apparatus includes a monitoring module 510, and a server switching module 520.

The monitoring module 510 is configured to monitor whether a primary server fails. The primary server is provided with a primary memory database. The primary memory database is configured to save in real time state information of the primary server each time after an operation is executed by the primary server. The state information is read and saved in real time by a backup memory database disposed in a backup server.

The server switching module 520 is configured to send a primary-backup switching command to the backup server in response to a failure of the primary server. The primary-backup switching command is configured to instruct the backup server to be upgraded as a new primary server according to the state information saved in the backup memory database.

With the technical solution provided by embodiments of the present disclosure, since the state information of the primary server is written into the primary memory database in real time, and the backup memory database in the backup server reads the state information from the primary memory database in real time, when the primary server fails, the backup server can quickly keep the state consistent with the state of the primary server before the failure, which effectively solves the problem that it takes a long time for the backup server to read operation records from a memory or a hard disk.

With regard to the apparatus in the above embodiment, the specific manner in which each module performs the operation has been described in detail in the embodiment of the method, and will not be described in detail here.

In some embodiments of the present disclosure, the primary memory database and the backup memory database are Redis memory databases.

In some embodiments of the present disclosure, the apparatus further includes a database switching module 530. The database switching module 530 is configured to switch the backup memory database in the backup server to be as a new primary memory database after the server switching module sends the primary-backup switching command to the backup server in response to the failure of the primary server.

In some embodiments, there are a plurality of backup servers, each of the plurality of backup servers includes a backup memory database configured to store the state information. The state information is read in real time from the primary memory database by the backup memory database in each of the plurality of backup servers. The server switching module 520 may include a selecting unit and a command sending unit.

The selecting unit is configured to select one backup server from the plurality of backup servers as a target backup server.

The command sending unit is configured to send the primary-backup switching command to the target backup server. The primary-backup switching command is configured to instruct the target backup server to be upgraded as a new primary server according to the state information saved in the backup memory database of the target backup server.

In some embodiments of the present disclosure, the server switching module 520 further includes a switching unit. The switching unit is configured to switch the backup memory database in the target backup server to be as a new primary memory database after the command sending unit sends the primary-salve switching command to the target backup server.

In some embodiments of the present disclosure, the monitoring module 510 may include a heartbeat sending unit and a determining unit.

The heartbeat sending unit is configured to send a heartbeat packet to the primary server every a first time period.

The determining unit is configured to determine whether a response to the heartbeat packet is received within a second time period. If so, the primary server does not fail, otherwise, the primary server fails.

Figure 6:
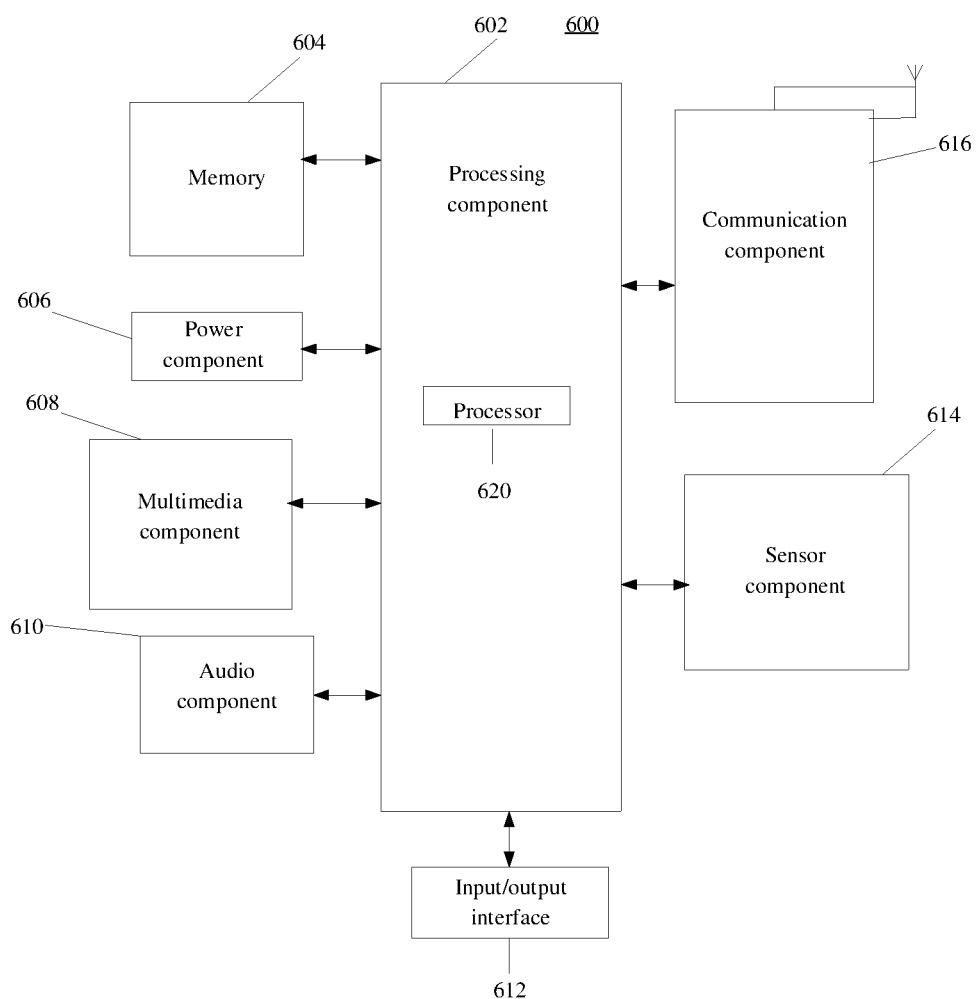
FIG. 6 is a block diagram of an apparatus for primary-backup server switching according to some embodiments of the present disclosure.

FIG. 6 is a block diagram of a primary-backup server switching apparatus 600 according to an exemplary embodiment. For example, the apparatus 600 may be a mobile phone, a computer, a digital broadcasting terminal, a messaging device, a game console, a tablet device, a medical device, a fitness device, a personal digital assistant, etc.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 generally controls the overall operations of the apparatus 600, such as operations associated with display, telephone calls, data communications, camera operations, and recording operations. The processing component 602 may include one or more processors 620 to execute instructions to complete all or part of the steps of the above method. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support the operations of the apparatus 600. Examples of such data include instructions for any application or method operating on the apparatus 600, contact data, phone book data, messages, pictures, videos, etc. The memory 604 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 606 provides power for various components of the apparatus 600. The power component 606 may include a power management system, one or more power supplies, and other components associated with generating, managing, and distributing power to the apparatus 600.

The multimedia component 608 includes a screen that provides an output interface between the apparatus 600 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touch, swiping, and gestures on the touch panel. The touch sensor may not only sense the boundary of the touch or swiping action, but also detect the duration and pressure related to the touch or swiping operation. In some embodiments, the multimedia component 608 includes a front camera and/or a rear camera. When the apparatus 600 is in an operation mode, for example, a shooting mode or a video mode, the front camera and/or the rear camera may receive external multimedia data. Each of the front camera and the rear camera may be a fixed optical lens system or has a focal length and optical zoom capabilities.

The audio component 610 is configured to output and/or input audio signals. For example, the audio component 610 includes a microphone (MIC), and when the apparatus 600 is in an operation mode, for example, a call mode, a recording mode, and a voice recognition mode, the microphone is configured to receive external audio signals. The received audio signals may be further stored in the memory 604 or transmitted via the communication component 616. In some embodiments, the audio component 610 further includes a loudspeaker configured to output audio signals.

The I/O interface 612 provides an interface between the processing component 602 and a peripheral interface module. The peripheral interface module may be a keyboard, a click wheel, buttons, and the like. These buttons may include, but are not limited to: a home button, a volume button, a start button, and a lock button.

The sensor component 614 includes one or more sensors configured to provide the apparatus 600 with various aspects of state assessment. For example, the sensor component 614 may detect the on/off state of the apparatus 600, and the relative positioning of components, such as a display and a keypad of the apparatus 600. The sensor component 614 may also detect the position change of the apparatus 600 or a component of the apparatus 600, the presence or absence of contact between the user and the apparatus 600, the orientation or acceleration/deceleration of the apparatus 600, and the temperature change of the apparatus 600. The sensor component 614 may include a proximity sensor configured to detect the presence of nearby objects when there is no physical contact. The sensor component 614 may also include a light sensor, such as a CMOS or CCD image sensor, for use in imaging applications. In some embodiments, the sensor component 614 may also include an acceleration sensor, a gyroscope sensor, a magnetic sensor, a pressure sensor, or a temperature sensor.

The communication component 616 is configured to facilitate wired or wireless communications between the apparatus 600 and other devices. The apparatus 600 may access a wireless network based on a communication standard, such as WiFi, a service providers network (such as 2G, 3G, 4G or 5G), or a combination thereof. In an exemplary embodiment, the communication component 616 receives a broadcast signal or broadcast related information from an external broadcast management system via a broadcast channel In an exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology and other technologies.

In an exemplary embodiment, the apparatus 600 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to execute the above method for primary-backup server switching.

In an exemplary embodiment, a non-transitory computer-readable storage medium including instructions is further provided, such as the memory 604 including the instructions, and the above instructions may be executed by the processor 620 of the apparatus 600 to complete the above method. For example, the non-transitory computer-readable storage medium may be an ROM, a random access memory (RAM), a CD-ROM, a magnetic tape, a floppy disk, an optical data storage device, etc.

Figure 7:
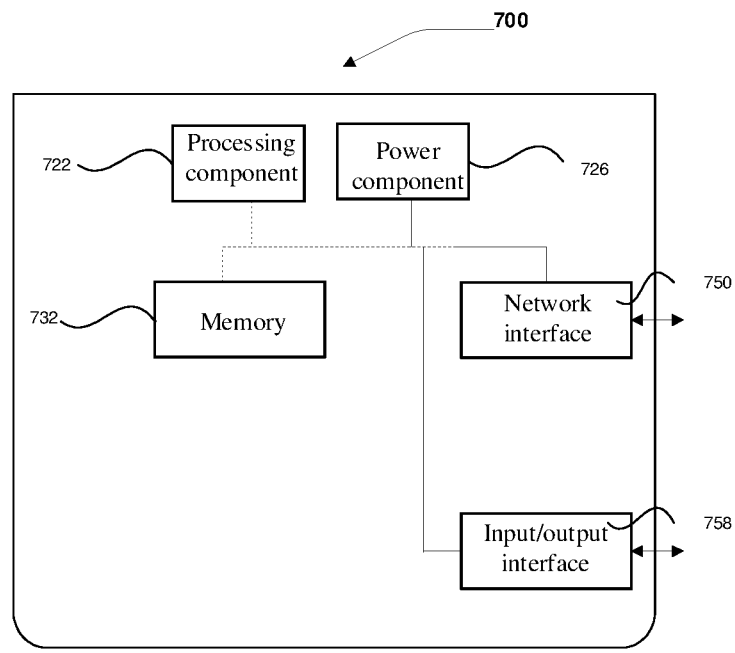
FIG. 7 is a block diagram of another primary-backup server switching apparatus according to some embodiments of the present disclosure.

FIG. 7 is a block diagram of another primary-backup server switching apparatus 700 according to an exemplary embodiment. For example, the apparatus 700 may be provided as a server. Referring to FIG. 7, the apparatus 700 includes a processing component 722 including one or more processors; and a memory resource represented by a memory 732, configured to store instructions executable by the processing component 722, such as an application program. The application program stored in the memory 732 may include one or more modules each corresponding to a set of instructions. In addition, the processing component 722 is configured to execute the instructions, so as to execute any primary-backup server switching method provided in the embodiments of the present disclosure.

The apparatus 700 may also include a power component 726 configured to perform power management of the apparatus 700, a wired or wireless network interface 750 configured to connect the apparatus 700 to a network, and an input/output (I/O) interface 758. The apparatus 700 may operate an operating system stored in the memory 732, such as Windows Server™, Mac OS X™, Unix™, Linux™, FreeBSD™ or the similar.

Figure 8:
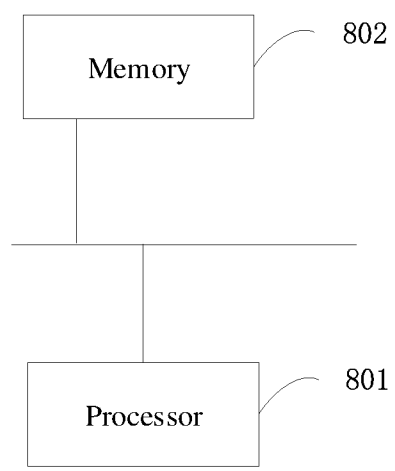
FIG. 8 is a block diagram of a server configured to implement a primary-backup server switching method according to some embodiments of the present disclosure.

As shown in FIG. 8, a control server is also provided in an exemplary embodiment. The control server is in communication connection with a primary server and a backup server, and includes:

a processor 801; and a memory 802, configured to store instructions executable by the processor.

The processor 801 is configured to:

monitor whether the primary server fails, wherein the primary server is provided with a primary memory database, the primary memory database is configured to save in real time state information of the primary server each time after an operation is executed by the primary server, and the state information is configured to be read and saved in real time by a backup memory database disposed in the backup server; and send a primary-backup switching command to the backup server in response to a failure of the primary server, wherein the primary-backup switching command is configured to instruct the backup server to be upgraded as a new primary server according to the state information saved in the backup memory database.

In some embodiments, the primary memory database and the backup memory database are Redis memory databases.

In some embodiments, the processor 801 is further configured to switch the backup memory database in the backup server to be as a new primary memory database.

In some embodiments, there are a plurality of backup servers, each of the plurality of backup servers includes a backup memory database configured to store the state information, the state information is read in real time from the primary memory database by the backup memory database in each of the plurality of backup servers; and the processor is further configured to:

select one backup server from the plurality of backup servers as a target backup server; and send the primary-backup switching command to the target backup server, wherein the primary-backup switching command is configured to instruct the target backup server to be upgraded as a new primary server according to the state information saved in the backup memory database of the target backup server.

In some embodiments, the processor 801 is further configured to switch the backup memory database in the target backup server to be as a new primary memory database.

In some embodiments, the processor 801 is further configured to:

send a heartbeat packet to the primary server every a first time period; and determine whether a response to the heartbeat packet is received within a second time period;

determine that the primary server fails in response to not receiving the response within the second time period; and determine that the primary server does not fail in response to receiving the response within the second time period.

Other embodiments of the present disclosure will be apparent to those skilled in the art from consideration of the specification and practice of the disclosure herein. The present disclosure is intended to cover any variations, uses, or adaptations of the present disclosure following the general principles of the present disclosure and including common general knowledge or customary technical means in the art not disclosed herein. It is intended that the specification and embodiments be considered as exemplary only, with a true scope and spirit of the present disclosure being indicated by the following claims.

It should be understood that the present disclosure is not limited to the precise constructions described above and shown in the drawings, and that various modifications and changes may be made without departing from the scope thereof. The scope of the present disclosure is limited only by the accompanying claims.

What is claimed is:

1. A method for primary-backup server switching, applied to a control server in communication connection with a primary server and a backup server in a distributed storage system with stateful service, and comprising:

monitoring whether the primary server fails, wherein the primary server is provided with a primary memory database, the primary memory database is configured to save in real time state information of the primary server each time after an operation is executed by the primary server, the state information of the primary server is read from the primary memory database in real time by a backup memory database disposed in the backup server, the state information comprises a result of each operation executed by the primary server, the primary memory database and the backup memory database are Redis memory databases, the Redis memory databases are key-value databases, and the state information read from the primary memory database in real time by the backup memory database is saved in the primary memory database and the backup memory database in a same key-value form; and sending a primary-backup switching command to the backup server in response to a failure of the primary server, wherein the primary-backup switching command is configured to instruct the backup server to be upgraded as a new primary server according to the state information saved in the backup memory database.

2. The method according to claim 1, further comprising:

switching the backup memory database in the backup server to be as a new primary memory database.

3. The method according to claim 1, wherein there are a plurality of backup servers, each of the plurality of backup servers comprises a backup memory database configured to store the state information, the state information is read in real time from the primary memory database by the backup memory database in each of the plurality of backup servers; and said sending the primary-backup switching command to the backup server in response to the failure of the primary server comprises:

selecting one backup server from the plurality of backup servers as a target backup server; and sending the primary-backup switching command to the target backup server, wherein the primary-backup switching command is configured to instruct the target backup server to be upgraded as a new primary server according to the state information saved in the backup memory database of the target backup server.

4. The method according to claim 3, further comprising:

switching the backup memory database in the target backup server to be as a new primary memory database.

5. The method according to claim 1, wherein said monitoring whether the primary server fails comprises:

sending a heartbeat packet to the primary server every first time period;

determining whether a response to the heartbeat packet is received within a second time period;

determining that the primary server fails in response to not receiving the response within the second time period; and determining that the primary server does not fail in response to receiving the response within the second time period.

6. A server, in communication connection with a primary server and a backup server in a distributed storage system with stateful service, and comprising:
   a processor; and
   a memory, configured to store instructions executable by the processor; wherein
   the processor is configured to:
   monitor whether the primary server fails, wherein the primary server is provided with a primary memory database, the primary memory database is configured to save in real time state information of the primary server each time after an operation is executed by the primary server, the state information of the primary server is read from the primary memory database in real time by a backup memory database disposed in the backup server, the state information comprises a result of each operation executed by the primary server, the primary memory database and the backup memory database are Redis memory databases, the Redis memory databases are key-value databases, and the state information read from the primary memory database in real time by the backup memory database is saved in the primary memory database and the backup memory database in a same key-value form; and
   send a primary-backup switching command to the backup server in response to a failure of the primary server, wherein the primary-backup switching command is configured to instruct the backup server to be upgraded as a new primary server according to the state information saved in the backup memory database.

7. The server according to claim 6, wherein the processor is further configured to:
   switch the backup memory database in the backup server to be as a new primary memory database.

8. The server according to claim 6, wherein there are a plurality of backup servers, each of the plurality of backup servers comprises a backup memory database configured to store the state information, the state information is read in real time from the primary memory database by the backup memory database in each of the plurality of backup servers; and the processor is further configured to:
   select one backup server from the plurality of backup servers as a target backup server; and
   send the primary-backup switching command to the target backup server, wherein the primary-backup switching command is configured to instruct the target backup server to be upgraded as a new primary server according to the state information saved in the backup memory database of the target backup server.

9. The server according to claim 8, the processor is further configured to:
   switch the backup memory database in the target backup server to be as a new primary memory database.

10. The server according to claim 6, the processor is further configured to:
   send a heartbeat packet to the primary server every first time period; and
   determine whether a response to the heartbeat packet is received within a second time period;
   determine that the primary server fails in response to not receiving the response within the second time period; and
   determine that the primary server does not fail in response to receiving the response within the second time period.

11. A non-transitory computer-readable storage medium, stored thereon with instructions that, when executed by a processor of an electronic device, cause the electronic device to implement a method for primary-backup server switching in a distributed storage system with stateful service, the method comprising:
   monitoring whether the primary server fails, wherein the primary server is provided with a primary memory database, the primary memory database is configured to save in real time state information of the primary server each time after an operation is executed by the primary server, the state information of the primary server is read from the primary memory database in real time by a backup memory database disposed in the backup server, the state information comprises a result of each operation executed by the primary server, the primary memory database and the backup memory database are Redis memory databases, the Redis memory databases are key-value databases, and the state information read from the primary memory database in real time by the backup memory database is saved in the primary memory database and the backup memory database in a same key-value form; and
   sending a primary-backup switching command to the backup server in response to a failure of the primary server, wherein the primary-backup switching command is configured to instruct the backup server to be upgraded as a new primary server according to the state information saved in the backup memory database.

12. The non-transitory computer-readable storage medium according to claim 11, wherein the method further comprises:
   switching the backup memory database in the backup server to be as a new primary memory database.

13. The non-transitory computer-readable storage medium according to claim 11, wherein there are a plurality of backup servers, each of the plurality of backup servers comprises a backup memory database configured to store the state information, the state information is read in real time from the primary memory database by the backup memory database in each of the plurality of backup servers; and
   said sending the primary-backup switching command to the backup server in response to the failure of the primary server comprises:
   selecting one backup server from the plurality of backup servers as a target backup server; and
   sending the primary-backup switching command to the target backup server, wherein the primary-backup switching command is configured to instruct the target backup server to be upgraded as a new primary server according to the state information saved in the backup memory database of the target backup server.

14. The non-transitory computer-readable storage medium according to claim 13, wherein the method further comprises:
   switching the backup memory database in the target backup server to be as a new primary memory database.

15. The non-transitory computer-readable storage medium according to claim 11, wherein said monitoring whether the primary server fails comprises:
   sending a heartbeat packet to the primary server every first time period;
   determining whether a response to the heartbeat packet is received within a second time period;
   determining that the primary server fails in response to not receiving the response within the second time period; and determining that the primary server does not fail in response to receiving the response within the second time period.

\* \* \* \* \*